United States Patent [19]

Tohill

[11] 4,353,560
[45] Oct. 12, 1982

[54] METAL SEAL ASSEMBLY WITH DEFORMABLE SEALING RING

[75] Inventor: Henry O. Tohill, Bossier City, La.

[73] Assignee: W-K-M Wellhead Systems, Inc., Shreveport, La.

[21] Appl. No.: 328,053

[22] Filed: Dec. 7, 1981

[51] Int. Cl.³ .......................... F16J 15/08; F16J 15/10
[52] U.S. Cl. ..................................... 277/236; 277/117; 277/124; 277/125; 277/190; 285/140
[58] Field of Search .............................. 277/117-125, 277/236, 190, 191, 206 R; 285/140, 139, DIG. 18

[56] References Cited

U.S. PATENT DOCUMENTS

| 412,874 | 10/1889 | Chaddack | 277/117 |
| 2,075,947 | 4/1937 | Kennedy | 277/117 X |
| 3,047,301 | 7/1962 | Taylor et al. | 277/117 |
| 3,797,864 | 3/1974 | Hynes et al. | 285/140 |
| 3,915,462 | 10/1975 | Bruns et al. | 277/190 |
| 4,131,287 | 12/1978 | Gunderson et al. | 277/236 X |

Primary Examiner—Robert S. Ward, Jr.
Attorney, Agent, or Firm—Marvin J. Marnock

[57] ABSTRACT

A metallic sealing ring assembly (10) for sealing an annulus between metallic surfaces of concentric tubular members. The assembly comprises a central metallic sealing ring (11) having flared upper and lower annular flanges (14, 15, 16, 17) at both its inner and outer peripheries. The sealing ring 11 is sandwiched between upper and lower adapter rings (12, 13) disposed concentric therewith and formed with bevelled annular edges (12a, 12b, 13a, 13b) which contact flared surfaces (14a, 15a, 16a, 17a) of the sealing ring flanges (14, 15, 16, 17) at a mating angle of five degrees. When axially compressed, the annular flanges of the metal sealing ring (11) are deflected radially and at their tips are deformed and extruded against the surfaces of the members (18, 19) defining the annulus to establish metal-to-metal seals therewith. The flanges are truncated at their free ends whereby initial engagement of the adapter rings (12, 13) with the metallic sealing ring (11) and annulus defining members (18, 19) is along the annular edges (14c–17c, 14d–17d) of the flange tips and the compression force is concentrated thereat. Axial loading is applied by hold-down screws (50) with tips (51) in camming engagement with a camming surface (52) on the upper adapter ring (18).

6 Claims, 3 Drawing Figures

4,353,560

METAL SEAL ASSEMBLY WITH DEFORMABLE SEALING RING

BACKGROUND OF THE INVENTION

This invention relates to a metal seal assembly which is useful in high temperature, corrosive environments for sealing the annular space between concentric tubular well members as between a casing hanger and a casing head.

A variety of packing assemblies and metal seals have heretofore been employed for sealing in a wellhead. In most wellhead applications of packing assemblies which include metal seal rings, the rings are compressed in the vertical direction between vertically opposed annular radial shoulders of the concentric tubular members of the wellhead and loading of the seal ring is provided by the weight of the inner tubing or casing string. In other applications, activation of the metal seal rings to effect a seal is induced by non-metallic members which lose reliability at high temperatures and in corrosive environments.

SUMMARY OF THE INVENTION

The present invention is directed to a metallic sealing ring assembly for sealing an annulus between a pair of concentric tubular members such as in a wellhead assembly. The metallic sealing ring assembly is particularly adapted to seal off an annulus under pressure to prevent leakage if conditions such as high temperature, fire, or corrosive liquids or gases are encountered. The sealing assembly is positioned in the annulus in a sleeved relationship about the inner tubular member and supported on a supporting surface on one of the tubular members. The assembly comprises a central sealing ring made of metallic material which is provided with flared upper and lower flanges at both its inner and outer peripheries. The central sealing ring is positioned between upper and lower adapter rings which are formed of a harder metal than the central sealing ring. The bottom of the upper adapter ring and the top of the lower adapter ring are formed with annular bevelled edges which engage the flared inner and outer annular flanges of the central sealing ring at a mating angle of five degrees as provided by the difference in flare angles between the bevelled edges of the adapter rings and the flare angles of the contacting flanges of the metal sealing ring. The annular flanges of the central metal sealing ring are truncated so that initial engagement of the adapter rings with the metal sealing ring are along annular edges of the flange ends. When an axial compressive load is applied to the sealing ring assembly, the loading force is distributed along the annular edges and the flared ends of the sealing ring flanges are thereby deformed and extruded against the surfaces defining the annulus to form pressure-tight seals therewith. Axial loading of the sealing ring assembly is effected mechanically by means of holddown screws extending through the wall of the outer tubular member and provided with conical tips for engaging a camming surface on the exterior of the upper adapter ring whereby the upper adapter ring is moved axially downward by means of the holddown screws.

Thus, an object of the invention is the provision of a metallic sealing ring assembly which is particularly suited for sealing off an annulus under pressure and adverse conditions such as high temperatures, fire, or the presence of corrosive liquids or gases.

A further object is to provide a sealing assembly for sealing off an annulus between concentric tubular members by means of a metallic sealing ring provided with inner and outer annular flanges, the ends of which are radially deformable and extrudable by mechanical compression means to effect metal-to-metal seals with the concentric members defining the annulus.

A still further object is to provide a metallic sealing ring assembly suitable for sealing an annulus between concentric cylindrical surfaces, such as between tubular members in a wellhead, wherein axial loading of the assembly to effect a seal is adjustably applied by mechanical means and the assembly is effective for bi-directional sealing.

BRIEF DESCRIPTION OF THE DRAWINGS

In the accompanying drawings, which form a part of the specification and are to be read in conjunction therewith.

DETAILED DESCRIPTION OF THE INVENTION

Figure 1:
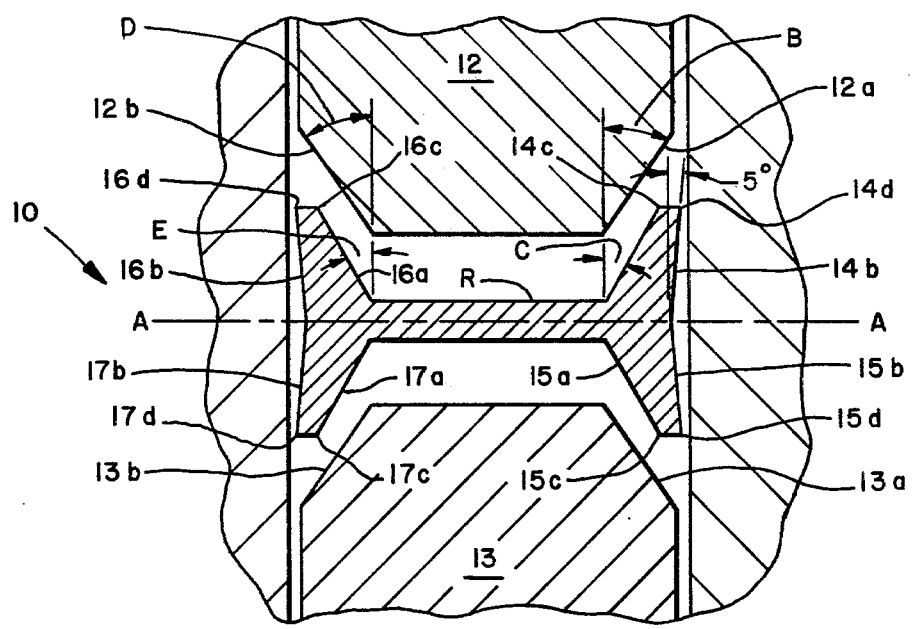
FIG. 1 is a fragmentary exploded view showing the configuration of the metal sealing ring of the invention as it appears in radial section.

Referring more particularly to the drawings, FIG. 1 is a fragmentary exploded view of a radial section of the metal sealing ring assembly 10 of the invention. The assembly 10 includes a metal seal ring 11. A top seal adapter ring 12 and a bottom seal adapter ring 13 which are formed of a harder metal than the metal seal ring 11. The metal seal ring 11 is provided with an inner pair of oppositely disposed upper and lower annular flanges or lips 14 and 15, respectively, which are formed about the inner periphery of the ring and provide external sealing surfaces which are adapted to seal with the innermost of the concentric cylindrical surfaces defining the annulus. The seal ring 11 is also provided with an outer pair of oppositely disposed upper and lower annular flanges or lips 16 and 17, respectively, which are formed about the outer periphery of the ring and provide external sealing surfaces for sealing against the inner bore of the outermost tubular member defining the annulus.

Figure 2:
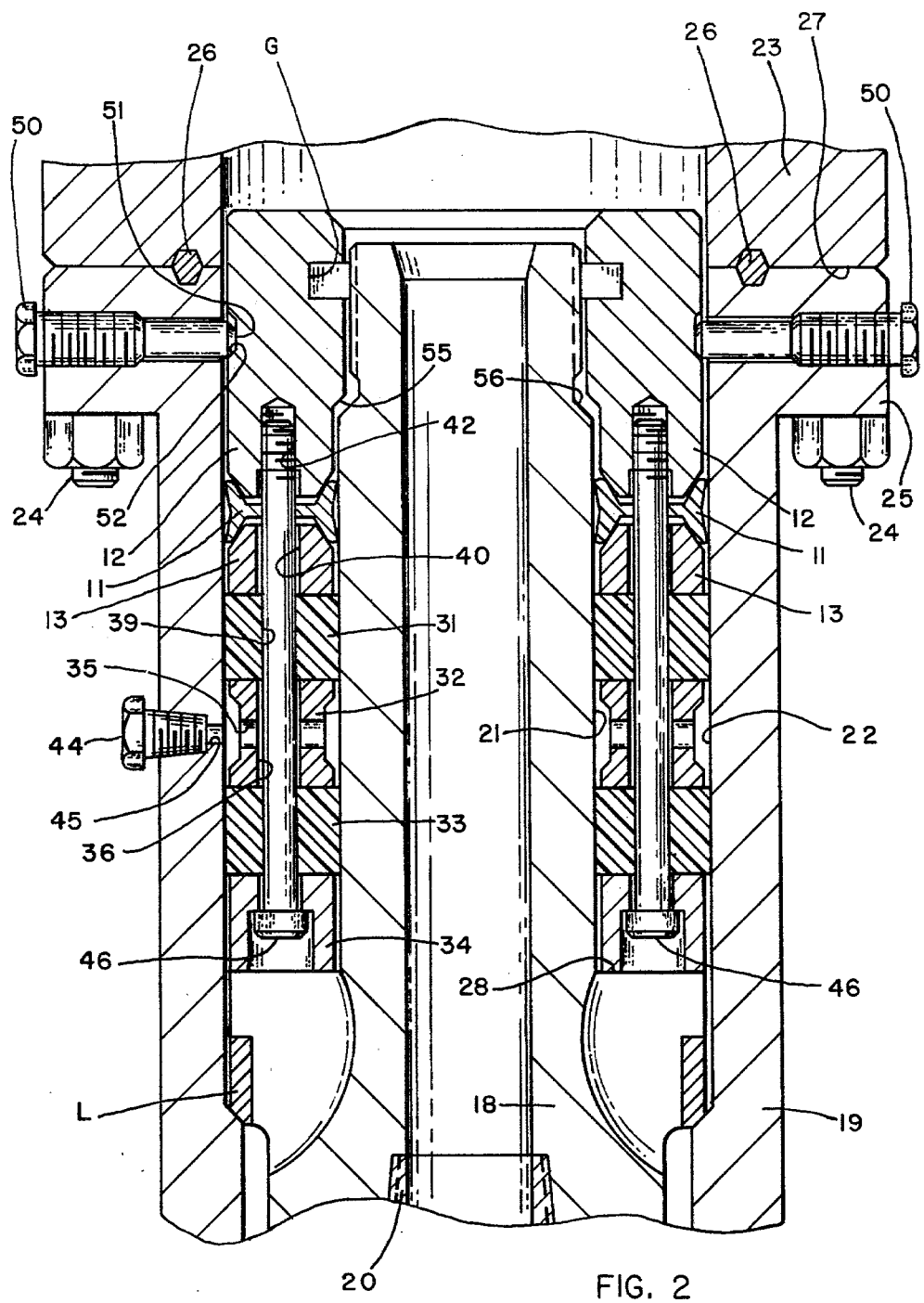
FIG. 2 is an elevational view, partly in vertical section, of a portion of a wellhead assembly in which the metal sealing ring assembly of this invention is installed to seal the annulus between concentric tubular members of the wellhead.

The configuration of the adapter rings 12 and 13 is best shown in FIG. 2, wherein the sealing assembly 10 is shown installed in a wellhead for sealing the annulus between a pair of concentric tubular wellhead components such as a casing hanger 18 and a casing head 19. The bottom end of the top adapter ring 12 and the upper end of the bottom adapter ring 13 are each provided with end surfaces which are presented towards one another for engaging the inner annular surfaces 14a and 16a of the upper metal seal ring lips 14 and 16 and the inner annular surfaces 15a and 17a of the lower metal seal ring lips 15 and 17. As shown in FIG. 1, the adapter 12 is provided adjacent its lower end surface with an annular downwardly facing tapered surface 12a which faces inwardly and engages the annular surface 14a of the metal seal ring 11. The adapter surface 12a is a frusto-conical surface defined by a cone within a cone angle of 110°, and a cone axis through the centers of the rings. As measured from the bottom of adapter ring 12, the surface 12a tapers upwardly from the bottom of the ring 12 at an angle "B" equal to 35°. The annular surface 14a of the lip 14 is also a frusto-conical surface as defined by a cone with a cone axis through the centers of the rings and a cone angle of 120°. As measured from the central rib section "R" of the metal seal ring 11, the surface 14a tapers upwardly therefrom at an angle "C" equal to 30°. Accordingly, the surfaces 12a and 14a engage at a mating angle of 5°, which represents the difference in taper between these surfaces.

The adapter ring 12 is also provided with a downwardly facing tapered surface 12b which faces outwardly and engages the radially inward facing annular surface 16a of the lip 16 of the seal ring 11. The surfaces 12b and 16a are frusto-conical surfaces with a difference in taper of 5° therebetween as illustrated by the angles "D" and "E" in FIG. 1 which equal 35° and 30°, respectively.

The lower adapter ring 13 is similarly bevelled about its upper end to provide inner and outer frusto-conical surfaces 13a and 13b which are adapted to engage the downward facing frusto-conical surfaces 15a and 17a of the flanges 15 and 17. The surfaces 13a and 13b taper downwardly from the top of the ring 13 at an angle of 35°. The metal seal ring 11 is symmetrically configured about the central radial axis "A" and the rib section "R" so that the mating surfaces 15a, 13a and the mating surfaces 17b and 13b engage at a mating angle of 5° corresponding to their difference in tapers.

It will also be seen that inward facing frusto-conical surfaces 14b and 15b of the flanges 14 and 15 define the inner peripheral surface of the metallic sealing ring 11 and these surfaces converge along a radial axial plane "A—A" through the center of the ring 11. The surface 14b of upper flange 14 faces slightly downward at a five degree taper from the vertical longitudinal axis of the assembly 10 and the surface 15b of lower flange 15 faces slightly upward at a five degree taper from the longitudinal axis.

Similarly, the frusto-conical surfaces 16b and 17b which define the outer peripheral surface of the ring 11 also converge radially inwardly along the radial plane "A—A" and are also characterized by five degree tapers. Thus, the inner and outer peripheral surfaces of the ring 11 are slightly recessed and are adapted to engage the tubular members defining the annulus at very small mating angles of approximately five degrees.

The metallic sealing ring assembly of this invention is particularly suited for sealing between tubular components in a wellhead wherein high pressures, high temperatures, fires and corrosive well fluids are likely to be encountered. A typical application of the invention in a wellhead installation is shown in FIG. 2.

As shown in FIG. 2, the casing hanger 18, from which a casing string 20 is suspended, is mounted in concentric relationship within casing head 19 and the metal seal ring 11 is activated to seal the annulus as defined by the outer cylindrical surface 21 of casing hanger 18 and the inner bore surface 22 of casing head 19.

Supported atop the casing head 19 is another wellhead component such as a tubing head 23 which is bolted to the top end of the casing head 19 by means of bolts or studs 24. The bolts 24 extend upwardly through a radial flange 25 formed at the top end of the casing head and are threaded into accommodating threaded bores (not shown) in the underside of the tubing head 23. A sealing ring 26, of elastomer material or the like, is positioned in conventional fashion in accommodating opposed annular grooves which are respectively formed in the top end surface of the casing head and the bottom end surface 27 of the tubing head 23 for establishing a seal therebetween.

In the installation shown in FIG. 2, the metal sealing ring assembly 10 is arranged as part of an overall wellhead packing assembly wherein the bottom seal adapter 13 also serves as an upper retainer for the wellhead packing assembly which is disposed in the annulus between the casing hanger 18 and the casing head 19 in sleeved relationship about the casing hanger. The wellhead packing assembly includes an upper packing ring 31, a lower packing ring 33, a lubricating ring 32 intermediate the two packing rings, and a bottom steel retainer ring 34. The bottom retainer ring 34 is landed on a shoulder 28 provided on the casing hanger 18 which is fluted therebelow. The casing hanger 18 is also provided with a landing ring "L" which is press fitted onto the hanger adjacent the fluted areas thereof and seats on an upward facing annular shoulder 29 provided in the bore of the casing head.

In the packing assembly the lubricating ring 32 is in the form of a conventional lantern ring having an annular recess in its exterior peripheral surface and provided with communicating transverse and longitudinal passageways 35, 36, respectively, whereby a packing lubricant can be injected into the annulus through an aperture in the wall of the casing head 19 and distributed through the passages and recesses of the lantern ring 32 to energize and lubricate the packings 31, 33. A removable plug 44 is shown installed in one such aperture 45 in the wall of the casing head 19. The aperture 45 thus serves as a lubricant injection part where an injection pressure fitting is to be applied and installed in the aperture 45 in lieu of the plug 44.

The metal seal assembly 10 comprising the metal seal ring 11 and top and bottom adapter rings 12 and 13 is clamped atop the packing assembly elements 31, 32, 33, 34 by means of a plurality of bolts 46 which extend through aligned vertical bores in the packing elements such as the bore 37 in the retainer 34, bore 38 in packing ring 33, vertical passage 36 in the lantern ring, bore 39 in packing ring 31, bore 40 in the seal adapter ring 13, bore 41 in the metal seal ring 11, and a threaded bore 42 which is formed in the underside of the top seal adapter 12. While only two bolts 46 are shown in FIG. 2, it is to be understood that a plurality of such bolts may be used, preferably in a uniform angularly spaced relationship to one another.

In the installation shown in FIG. 2, an axial load may be applied to the metal seal assembly 10 and the wellhead packing assembly by means of a plurality of holddown screws 50 which are threaded through lateral openings in the flange 23 at the top of the casing head 19 and are angularly spaced thereabout. The holddown screws 50 are formed with generally conical tips 51 and are of sufficient length to extend into the central bore of the casing head 19 where they engage the lower upward facing side wall 52 of an annular groove which is formed circumferentially about the exterior of the top seal adapter ring 12. As the holddown screws 50 enter the bore of the casing head, their conical tips 51 engage the tapered groove wall 52 of the top adapter ring 12 and cam the adapter ring 12 in the downward direction, thus applying an axial compressive force on the metal seal assembly of elements 11, 12, 13 as well as the packing elements 31, 32, 33 and 34 whereby sealing of the annulus is accomplished.

To avoid the application of excessive and possibly damaging axial loads to the metal seal assembly, the top adapter ring 12 is provided with an internal downward facing shoulder 55 which is disposed to engage a stop surface 56 provided on the exterior of the casing hanger. The adapter ring 12 is provided with a reduced internal diameter for its upper end portion and the shoulder 55 is a frusto-conical annular surface which joins the upper end portion of the adapter ring 12 with its lower portion having a larger internal diameter. The stop surface 56 of the casing hanger is a tapered frusto-conical surface corresponding to the taper of the shoulder 55. The stop surface 56 is formed by a reduction of the external diameter of the upper end of its casing hanger and joins the external surface of the reduced diameter upper end portion of the hanger with the external surface 21 of the large diameter portion of the casing hanger therebelow. The adapter ring shoulder 55 does not normally engage the stop 56 and is vertically spaced therefrom when an effective axial load is applied to the metal seal assembly 10 by the holddown screws 50. In the event, however, an excessive axial load is applied from either the top of the adapter ring 12 or from the bottom end of the packing assembly, the adapter ring shoulder 55 engages the stop 56 and precludes further downward movement of the adapter ring 12 relative to the casing hanger 18 thereby avoiding further compaction of the sealing and packing elements to a degree which would be deleterious to their sealing capabilities.

It is preferred that the initial sealing ring 11 be made of an elastic hard metal such as stainless steel so that the flanges 14, 15, 16 and 17 when engaged by the adapter rings and subjected to an axial compressive force will bend within the elastic limit of the metal.

As best seen in FIG. 1, it is also to be noted that the lips on flanges 14, 15, 16, and 17 are formed with truncated tips so that each flange, at its tip, is provided with inner and outer annular edges. The inner flanges 14 and 15 are thus provided at their free ends with inner annular edges 14d and 15d and outer annular edges 14c and 15c. Similarly, the outer flanges 16 and 17 are provided at their tips with inner annular edges 16c and 17c and outer annular edges 16d and 17d.

When assembled, with the adapter rings 12 and 13 in engagement with the sealing ring 11, only the tips of the annular flanges engage the adapter rings. Thus, the contact between the adapter ring 12 and sealing ring 11 is along annular edges 14c and 16c of the flanges 14 and 16, respectively, and in like manner, contact between the lower adapter ring 13 and the sealing ring 11 occurs along the annular edges 15c and 17c of the flanges 15 and 17, respectively.

Figure 3:
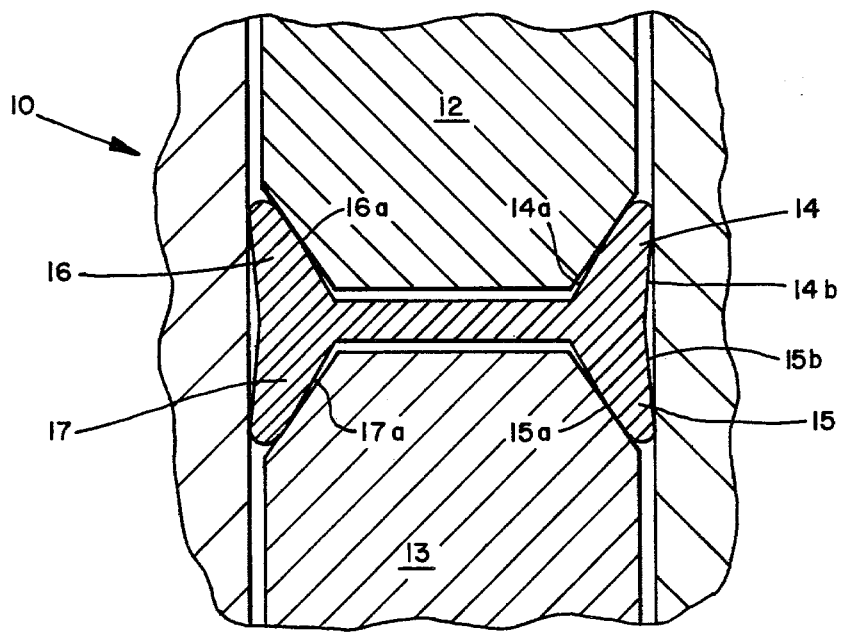
FIG. 3 is a fragmentary view of the metal sealing assembly of this invention as it appears in radial section, and showing the metal sealing ring thereof in the compressed loaded condition sealing the annulus between two concentric tubular members.

When an axial compression force is applied to the assembly 10, as shown in FIG. 3, the slightly elastic flanges are bent towards the transverse radial axis of the ring 11 to where the tips of the inner flanges 14 and 15 engage the cylindrical surface of the inner tubular member which defines the annulus and the tips of the outer flanges 16 and 17 engage the inner bore the annulus and the tips of the outer flanges 16 and 17 engage the inner bore surface of the outer tubular member defining the annulus. Since the flange tips are truncated, contact with the inner tubular member is first made at the annular edges 14d and 15d of flanges 14 and 15, respectively, and contact with the outer tubular member is first made by the annular edges 16d and 17d of the flanges 16 and 17. Thus, when an axial compressive force is applied by the upper adapter ring 12, it is initially distributed along these annular edges at the flange tips whereby the compressive force is greatly concentrated so as to induce a deformation of the flange tips and their partial extrusion towards the space between the adapter rings and the tubular members 18, 19. Extremely effective metal-to-metal seals are thereby established which could not otherwise be obtained if the compressing force were applied to surface areas.

It is also to be seen that the magnitude of the compressive force applied to the metallic sealing ring assembly 10 can be adjustably controlled by means of the holddown screws 50, depending on the extent of their insertion into the bore of the casing head 19 and their consequent interaction with the camming groove of adapter ring 12. Also, while the metallic sealing ring assembly 10 has been illustrated in conjunction with a wellhead packing assembly, it is to be understood that it can be installed separately therefrom, in which case the lower adapter ring 13 is seated directly on a landing element such as the shoulder 28 of the casing hanger 18.

The foregoing description of a preferred embodiment of the invention has been presented for purposes of illustration and description and is not intended to limit the invention to the precise form disclosed as changes in details of the illustrated construction may be made by those skilled in the art, within the scope of the appended claims, without departing from the spirit of the invention. The particular tapers of the bevelled edges of the adapter rings, for example, may be different from those shown, as long as the mating angles between the contacting surfaces of the adapter rings and the metallic sealing ring 11 are approximately five degrees.

What is claimed is:

1. A metallic sealing ring assembly for sealing an annulus between concentric tubular members, said metallic sealing assembly comprising:

a metallic sealing ring mounted within said annulus in sleeved relationship about the inner concentric tubular member, said metallic annular sealing ring comprising a central annular rib section;

a first pair of upper and lower annular flanges integrally formed with said rib section at the inner periphery thereof;

each said annular flange of said first pair being characterized by a radially inward facing frusto-conical surface which decreases in diameter to the distal end tip of said flange and is convergent with the other radially inward facing frusto-conical surface of said first pair along the central transverse axial plane through said metallic sealing ring to define therewith the inner peripheral surface of said metallic sealing ring;

and a radially outward facing frusto-conical surface extending upwardly from said rib section and decreasing in diameter to the distal end tip of each said flange;

a second pair of upper and lower annular flanges integrally formed with said rib section at the outer periphery thereof, each said annular flange of said second pair being characterized by a radially outward facing frusto-conical surface which increases in diameter to the distal end tip thereof and is convergent with the other radially outward facing frusto-conical surface of said second pair along the central transverse axial plane through said metallic sealing ring to define therewith the outer peripheral surface of said metallic sealing ring, and each having a radially inward facing frusto-conical surface extending from said rib section and increasing in diameter to the distal end of each said outer flange;

an upper adapter ring having inner and outer diameter substantially corresponding to the inner and outer diameter of said metallic sealing ring and disposed atop said metallic sealing ring in concentric relation therewith, said upper adapter ring adjacent its bottom surface having inner and outer bevelled surfaces, said inner bevelled surface being defined by a radially inward facing frusto-conical surface extending upwardly from the bottom surface of said upper adapter ring and decreasing in diameter to the inner periphery of said upper adapter ring at a flare angle which is approximately 5° less than the flare angle of the radially outward facing frusto-conical surface of the upper flange of said first pair of annular flanges and said outer bevelled surface being defined by a radially outward facing frusto-conical surface extending upwardly from the bottom surface of said upper adapter ring and increasing in diameter to the external periphery of said upper adapter ring at a flare angle which is approximately 5° less than the flare angle of the radially inward facing frusto-conical surface of the upper flange of said second pair of annular flanges;

a lower adapter ring having inner and outer diameters substantially corresponding to the inner and outer diameters of said metallic sealing ring and disposed below said metallic sealing ring in concentric contacting relation therewith, said lower adapter ring adjacent its top surface having inner and outer bevelled surfaces, said inner bevelled surface of said lower adapter ring being defined by a radially inward facing frusto-conical surface extending downwardly from the top surface of said lower adapter ring and decreasing in diameter to the inner periphery of said lower adapter ring at a flare angle which is approximately 5° less than the flare angle of the radially outward facing frusto-conical surface of the lower flange of said first pair of annular flanges, and said outer bevelled surface of said lower adapter ring being defined by a radially outward facing frusto-conical surface extending from the top surfaces of said lower adapter ring and increasing in diameter to the external periphery of said lower adapter ring at a flare angle which is approximately 5° less than the flare angle of the radially inward facing frusto-conical surface of the lower flange of said second pair of annular flanges; and means for effecting an axial compression of said metallic sealing ring assembly whereby said inner upper and lower pair of annular flanges are deflected radially inward and said outer upper and lower pair of annular flanges are deflected radially outward to engage and establish metal-to-metal seals with the surfaces of the concentric tubular members defining said annulus.

2. A metallic sealing ring assembly as set forth in claim 1 wherein said upper and lower adapter rings are formed of a harder metal than said metallic sealing ring.

3. A metallic sealing ring assembly as described in claim 2 wherein each said annular flange is truncated at the distal end thereof to provide inner and outer annular edges whereby said annular metallic sealing ring is first engaged by the bevelled surfaces of said upper and lower adapter rings along annular edges of said metallic sealing ring and the surfaces of the concentric members defining said annulus are first engaged by annular edges of said metallic sealing ring when an axial compressive load is applied to the metallic sealing ring assembly thereby inducing a deformation and extrusion of the distal ends of said annular flanges for establishing sealing relationship with said adapter rings and said tubular members defining the annulus.

4. A metallic sealing ring assembly as set forth in claim 3 wherein said lower adapter ring is supported on a radial shoulder provided on one of said tubular members and said compression means comprises a groove in the external wall of said upper adapter ring, said groove having an upward facing lower side wall defining a tapered surface, a plurality of holddown screws extending through the wall of the outer tubular member defining said annulus and adapted to engage said upward facing lower groove wall and move said top adapter ring downwardly to thereby effect an axial compression of said metallic sealing ring assembly.

5. A metallic sealing ring assembly as set forth in claim 4 further including cooperative stop means on said upper adapter ring and one of said tubular members for limiting the axial movement of said upper adapter ring imparted by said compression means and thereby limiting the axial compression force which can be applied to said metallic sealing ring assembly.

6. In a packing assembly for sealing the annulus between an outer casing head and a concentric inner casing hanger of a wellhead assembly including an elastomeric resilient ring in the annulus and means to effect an axial compression of the packing assembly for expanding the resilient ring to provide a primary resilient seal between the casing head and the casing hanger;

an improved metal sealing ring positioned above the resilient ring to form a secondary metal seal between the casing head and casing hanger upon expansion thereof, said metal sealing ring comprising a central annular rib section, and upper and lower annular flanges integrally formed with said rib section at both the inner and outer peripheries thereof, each annular flange decreasing in thickness from the integral rib section to the distal end tip of the flange and each having a radially facing surface remote from the rib converging from its distal end tip toward the rib so that the distal end tips of the annular flanges on the inner periphery of the rib section extend in a free unexpanded position radially inwardly toward the adjacent peripheral surface of the casing hanger beyond the associated radially facing surfaces, and the distal end tips of the annular flanges on the outer periphery of the rib section extend in a free unexpanded position radially outwardly toward the adjacent peripheral surface of the casing head beyond the associated radially facing surfaces;

and upper and lower adapter rings on opposite sides of the metal sealing ring having adjacent surfaces for contacting the respective upper and lower flanges of the metal ring to deflect the metal flanges toward the adjacent peripheral surfaces of the casing head and casing hanger upon axial compression of the packing assembly to provide a tight metal-to-metal seal simultaneously with the primary resilient seal.

* * * * *